April 8, 1958 M. P. YOUNG 2,830,292
DEVICE TO POSITION A COMMUNICATIONS ANTENNA
Filed Dec. 29, 1950 3 Sheets-Sheet 1
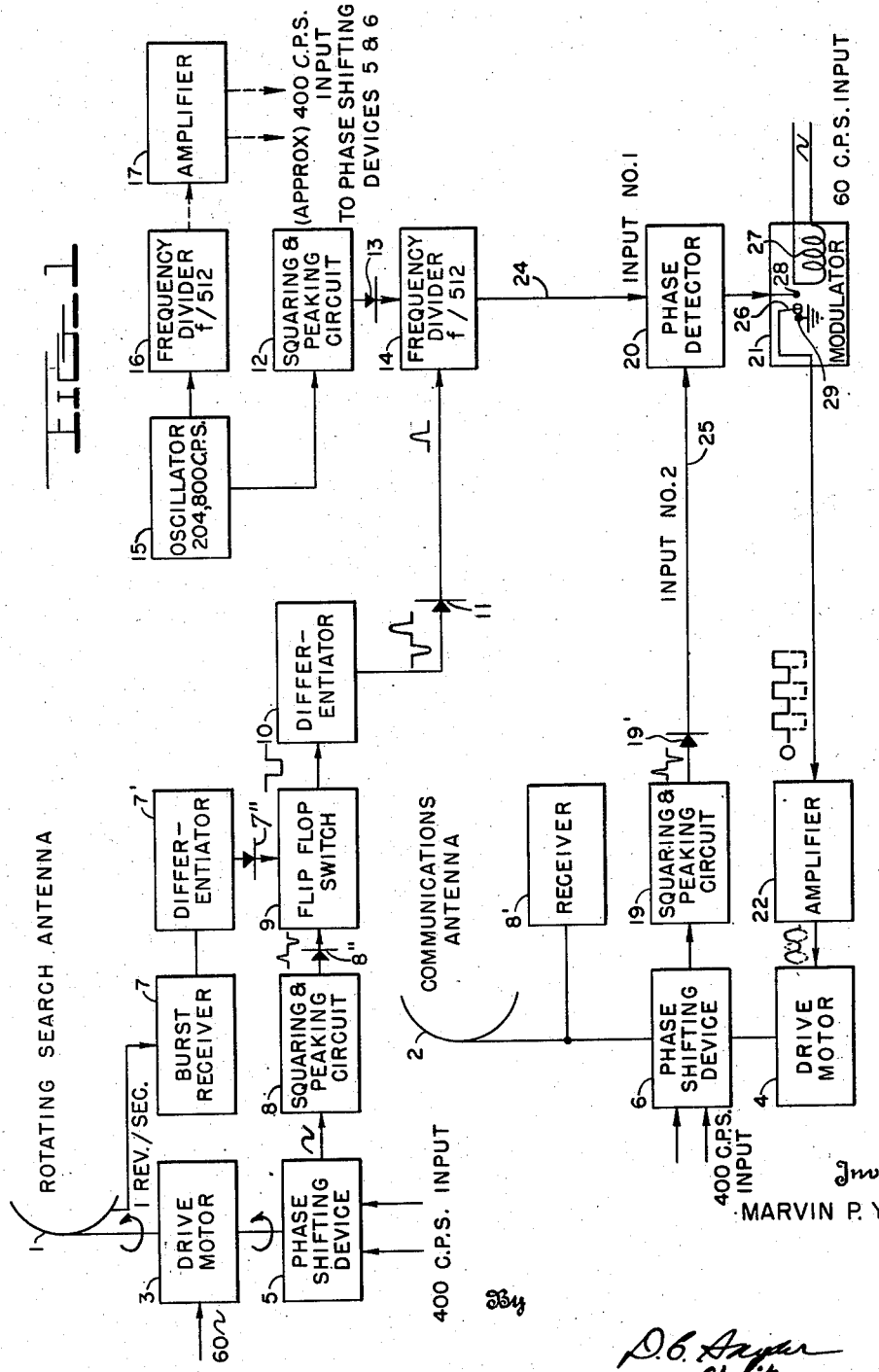
Inventor
MARVIN P. YOUNG

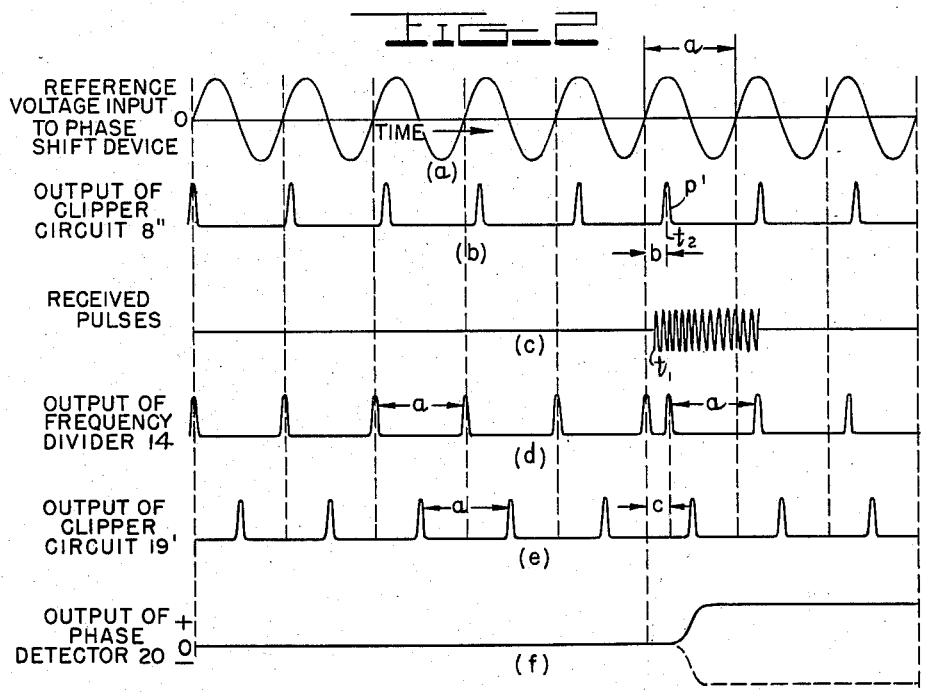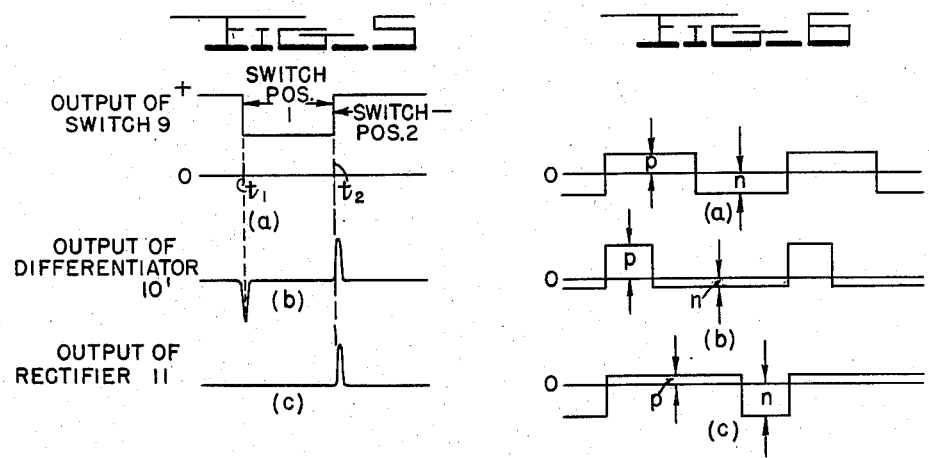

April 8, 1958 M. P. YOUNG 2,830,292
DEVICE TO POSITION A COMMUNICATIONS ANTENNA
Filed Dec. 29, 1950 3 Sheets-Sheet 3
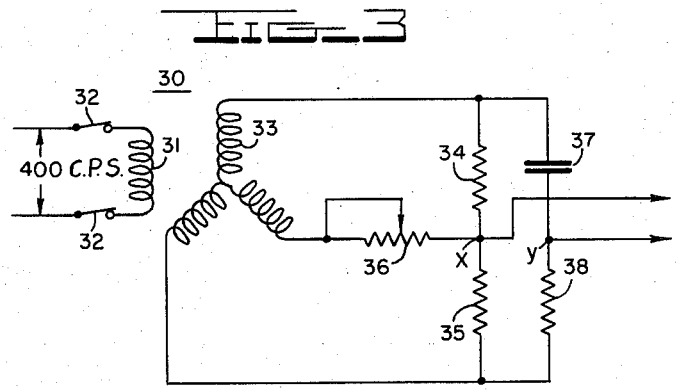
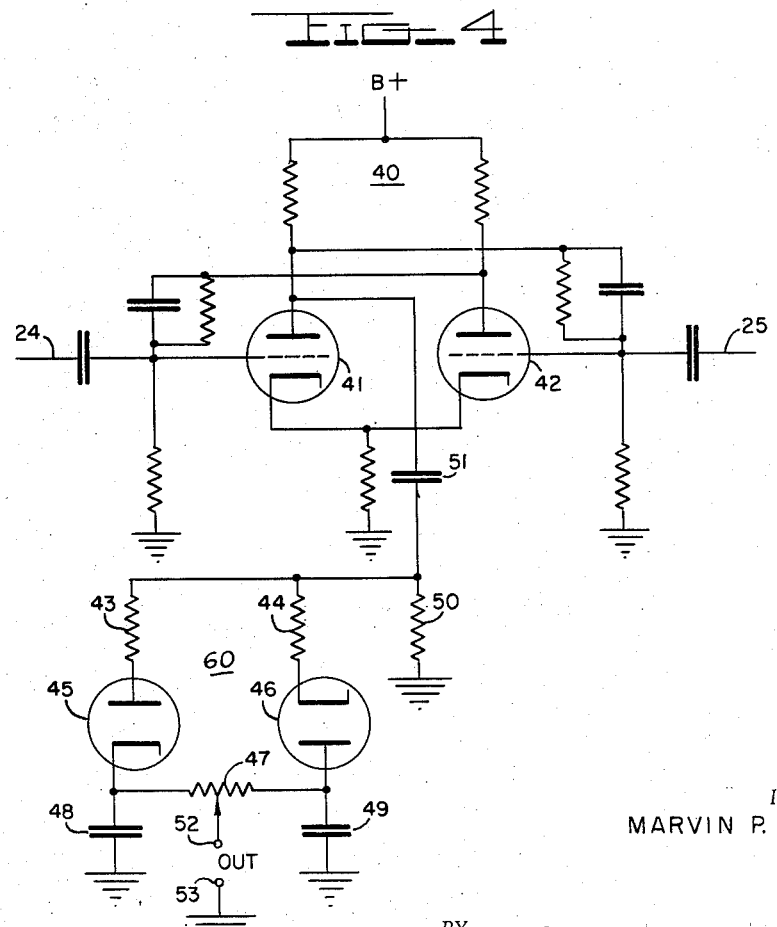
INVENTOR
MARVIN P. YOUNG
BY
ATTORNEYS United States Patent Office 2,830,292
Patented Apr. 8, 1958

2,830,292

DEVICE TO POSITION A COMMUNICATIONS ANTENNA

Marvin P. Young, Alexandria, Va.

Application December 29, 1950, Serial No. 203,463

10 Claims. (Cl. 343—117)

(Granted under Title 35, U. S. Code (1952), sec. 266)

This invention relates to apparatus for automatically positioning a directive communication antenna in the direction of reception of an incoming wave of a given frequency.

More particularly the present invention relates to a system for accurately positioning a communications antenna in the direction of an incoming wave of a given frequency as received by a constantly rotating search antenna.

The position of the rotating search antenna at the instant a burst of energy is received from a given direction is memorized as a phase position indicated by the output of a phase shifting device connected directly to the rotating search antenna. The memory is in the form of a continuous pulse train whose time phase relative to a reference signal corresponds to the output of the phase shifting device at the instant the burst is received and thus is an indication of the desired bearing of the communication antenna. This memorized position is then fed into a closed loop phase matching servo system where the phase of the memorized pulse train is compared with the phase of pulses indicating the position of the communications antenna and from the phase difference thereof is produced a control voltage which positions the communications antenna in the direction of the incoming wave.

Accordingly, one object of the present invention is to provide a novel system for automatically and quickly positioning a directive communications antenna in the direction from which a signal of a desired frequency is originating.

Another object of the present invention is to provide a novel system for automatically and accurately positioning a directive communications antenna so that it will be directed in a direction in which a continually rotating directive search antenna has received a burst of energy of a desired frequency.

Another object of the present invention is to provide a novel and accurate system for positioning a given shaft to a position corresponding to the value of given variable indicated by the timing of a short burst of information.

Another object of the present invention is to provide a phase memory system where the phase of a voltage at any given instant may be memorized.

These and other objects of the present invention will become apparent upon the reading of the specification and drawings wherein:

Fig. 1 is a block diagram of the system of the present invention.

Fig. 2 shows various waveforms necessary to the clear understanding of the present invention.

Fig. 3 is a circuit diagram of the phase shifting device 5 and 6.

Fig. 4 is a circuit diagram of a novel phase detecting circuit.

Fig. 5 shows other waveforms associated with the circuit shown in Fig. 1.

Fig. 6 shows various waveforms associated with the phase detector.

Referring now more particularly to Fig. 1, a directive communications antenna is coupled to a suitable selective receiver 8' which is tuned to a desired signal frequency. If the direction from which the desired signal is originating is not shown, without the aid of the present invention an operator would be required to slowly rotate the communications antenna 2 about the horizon to hunt for the desired signal. The present invention makes such operation unnecessary by automatically and quickly positioning communications antenna 2 in the direction of the desired signal.

A drive motor 3 continuously rotates a directive search antenna 1 which is coupled to the input of a frequency selective receiver 7. A phase shifting device 5, the circuit details of which are shown in Fig. 3, is coupled to the shaft of drive motor 3 and produces a sine wave output the phase of which varies with the position of search antenna 1. The reference phase is determined by the phase of, in this instance, a 400 cycle sine wave input to phase shifting device 5 as shown by waveform a of Fig. 2.

By means of conventional squaring and peaking circuits 8 which clip and then differentiate the resulting square wave in the well known and conventional manner, pulses are produced having the same phase respectively as the sine wave output of phase shifting device 5. Waveform b of Fig. 2 shows these pulses relative to the reference sine wave of waveform a when the search antenna has rotated a fraction of a revolution. The phase of the successive pulses as shown gradually changing in phase relative to the beginning of the nearest sine wave cycle of waveform a.

By means of rectifier device 8", the negative differentiated output from peaker 8 is eliminated as shown in waveform b of Fig. 2.

The signals picked up by search antenna 1 are fed to a frequency selective receiver 7 which is tuned to the desired frequency. Receiver 8' to which communications antenna 2 is coupled is also tuned to this frequency. A pulse output is produced in the receiver 7 representing the burst of energy received shown by waveform c of Fig. 2 when the directive response pattern of search antenna 1 includes the direction from which said desired frequency signal is approaching. By means of a conventional and well known differentiator circuit 7' and rectifier 7" a pulse is produced at the leading edge of the received energy which switches a flip flop switch 9 into a first switch position. Switch 9 is preferably a conventional and well known Eccles-Jordan two position stability trigger circuit of the type shown by circuit 40 in Fig. 4. The next pulse appearing in the output of rectifier 8" (pulse P' of waveform b in Fig. 2) will trigger switch 9 back to its original switch position. When the switch 9 is triggered back into original switch position, then by means of a common and well known differentiator circuit 10 similar to 7', and rectifier 11, a pulse is produced in synchronism therewith. (See the voltage waveforms a–c of Fig. 5). This pulse, as shown in waveform c of Fig. 5, has a phase relative to the reference frequency measured by interval b shown in waveform b of Fig. 2 and is a measure of the bearing of the search antenna directive pattern.

Other circuits may be provided to perform the functions of switch 9 such as a one shot (single stability) multivibrator which would open a gate circuit only long enough to allow the next pulse from peaking circuit 8 to be fed to frequency divider 14.

The problem is now to convert the position of the single pulse shown in waveform c of Fig. 5 into a series of pulses at the reference frequency (400 pulses per second) having the same phase as the single pulse of waveform c.

The circuit for accomplishing this result comprises a source of pulses derived from oscillator 15 in Fig. 1 having a pulse repetition rate greater than the reference frequency of 400 cycles per second, and a frequency divider 14 which divides by such a factor that the pulses at its output will occur at a rate of 400 pulses per second. If oscillator 15 has a sinusoidal output frequency of 204,800 cycles per second, and squaring and peaking circuit 12 and rectifier 13 convert the sinusoidal voltage into pulses having the same repetition rate or frequency, then frequency divider 14 must be designed to divide by 512 to produce the desired output of 400 pulses per second. Such a frequency divider may be a blocking oscillator frequency divider such as disclosed on page 595, volume 19, entitled "Waveforms" of the M. I. T. Radiation Laboratory series, 1949 edition.

If the pulse shown in waveform c of Fig. 5, which is the pulse produced when switch 9 is switched back to its original position by the pulse from rectifier 8", is used to reset to zero count frequency divider 14 (for the well known blocking oscillator type divider this means triggering the oscillator) then a series of pulses will be produced having a pulse repetition rate of 400 pulses per second which have the same phase relative to the reference frequency as the last mentioned pulse. The frequency divider 14 must of course only produce a pulse once every 512 pulses from zero pulse count position.

The circuit just described is thus a phase memory means since the phase of a single pulse is remembered in the form of a continuous group of pulses.

To obtain an indication of the position of the communications antenna 2 so that it can be compared with the bearing position of the incoming signals as indicated by the phase of the pulses from divider 14, a phase shifting device 6 similar to circuit 5 is coupled to the rotatable shaft of the communications antenna 2. The phase of the sine wave of voltage in its output circuit is therefore dependent on the position of the antenna 2. By means of squaring and peaking circuit 19 similar to circuit 8 and 12, the sine wave is converted into a group of pulses having the same phase. Then by means of rectifier 19', a pulse of a given polarity is fed to phase detector 20.

Phase detector 20, the details of which are shown in Fig. 4, produces a direct current voltage output whose magnitude and polarity are respectively proportional to the magnitude and sense of the phase difference of the 400 pulse trains per second pulses fed thereto from the frequency divider 14 and rectifier 19'.

Of course, there must be an initial adjustment of the system so that when the search antenna and communications antenna are stationary and facing in the same direction, the phase of the pulses produced by their associated circuits produces zero output in the phase detector 20. For the circuit shown in Fig. 4, condition of zero output occurs when pulses fed to the phase detector 20 by divider 14 and peaker 19 are 180 degrees out of phase. Thus, referring to waveforms d–f of Fig. 2, the phase of the pulses shown in the left portion of waveform d represent a condition where the direction of the directive pattern of the communications antenna and the direction of the incoming signal are identical so that the pulses shown in waveform e, which are the pulses at the output of rectifier 19', are 180 degrees out of phase therewith. Accordingly, the voltage output of the phase detector 20 is zero as shown by the left portion of waveform f.

The phase of the last three pulses shown in waveform d represent a condition where the bearing of the communications antenna 2 is not pointing in the direction of the incoming signal and accordingly the phase of these pulses are not 180 degrees out of phase with the pulses shown in waveform e but lag by an amount c from this condition. A net voltage appears in the output of phase detector 20 as shown by the solid line in the right portion of waveform f.

If the pulse output of frequency divider 14 shown in waveform d were leading the 180 out of phase condition by an amount c then the dotted curve in the right hand portion of waveform f would represent the output of the phase detector 20.

Assuming motor 4 is a two phase alternating current motor, the direct current voltage output of the phase detector must be converted to a suitable alternating current voltage such as 60 cycles per second by means of a vibrator 21. The vibrator comprises a vibrating contact 26 which by means of the 60 cycle alternating current flow in vibrating winding 27 is caused to intermittently make contact with terminal 28 and ground terminal 29. (This rate will be 60 cycles if vibrating element 26 is polarized.) Terminal 28 is coupled to the output of the phase detector 20.

For the solid curve of waveform f of Fig. 2 representing the direct current output of the phase detector 20 for a given phase condition, a square wave of voltage at the 60 cycle rate varying between a positive value and ground potential (see the solid curves in Fig. 1) will be fed to a conventional amplifier 22 which in turn feeds an alternating current voltage of a given phase to motor 4 in a manner well known in the art. Amplifier 22 is made to have a low frequency response so that the square wave input is converted to a sinusoidal voltage at its output.

If the output of the phase detector were the dotted line curve of waveform f of Fig. 2, then the square wave of voltage will be 180 degrees out of phase with the previously mentioned phase condition and will vary between a given negative value and ground potential. (See dotted curves in Fig. 1.) The voltage fed to drive motor 4 will therefore be 180 out of phase with the voltage fed thereto when the voltage output of the phase detector was that shown by the solid line in waveform f and will therefore rotate motor 4 in the opposite direction until the output of the phase detector is zero. Then the communications antenna 2 is properly positioned to receive the incoming signal.

The circuit details of one suitable phase shifting means 5 or 6 is shown in Fig. 3. The circuit in the form illustrated comprises a transformer 30 having a rotatable primary 31, which is coupled to the shaft of the associated rotatable antenna 1 or 2, and a delta or wye connected secondary 33. Connected to the three terminals of the secondary 33 are respective resistors 34, 35 and 36. Resistances 34 and 35 are made equal and resistance 36 is made about 30 percent of the value of resistance 34 or 35. A series circuit of a condenser 37 and a resistance 38 are placed across two of the secondary terminals. If the impedance of the condenser and the value of resistance 38 are made equal at the operating frequency (400 cycles) then as the primary 31 is gradually rotated throughout one revolution the phase of the voltage across points x and y of Fig. 3 will gradually be shifted through 360 degrees relative to the reference frequency which is fed to the primary winding 31 through slip rings 32.

If the primary is rotated at a rate of 1 revolution per second (which is a representative speed for search antenna 1), then the period of the sine wave in the output taken across terminals x and y will be either 1/399 or 1/401 second depending on the direction of rotation. (This is assuming that the voltage fed to the primary 31 is a 400 cycle sine wave.)

Figure 4 shows an example of a circuit for phase detector 20 which is also disclosed in the copending application of D. H. Gridley, Serial No. 199,907, filed December 8, 1950.

Phase detector 20 includes a conventional and well-known Eccles-Jordan two stability type trigger circuit 40 and a diode circuit 60. This circuit is such that if a positive pulse is fed to the grid of the left tube 41, this tube will be rendered conductive and tube 42 will be in a non-conductive condition. Likewise, if a positive pulse is fed to the grid of right tube 42, the latter tube will be rendered conductive and tube 41 will be in a non-conductive condition.

The voltage at the output of tube 41 is fed to a circuit including condenser 51, and a parallel circuit including resistance 50 in parallel with the parallel diode circuit 60. Diode circuit 60 includes two diodes 45 and 46 connected in opposed circuit relation so that only one diode is conductive at any one time. Resistors 43 and 44 are respectively in series with the diode 45 and 46. A condenser 48 is connected to the cathode of diode 45 and a condenser 49 is connected to the plate of diode 46. Potentiometer 47 is connected between the cathode of diode 45 and the plate of diode 46. The output is taken between the mid-point of potentiometer 47 which is connected to output terminal 52 and ground terminal 53. The circuit is made symmetrical in the sense that resistors 43 and 44, and condensers 48 and 49 are respectively made equal in value.

Due to the fact that the time constant of the condenser diode charge paths are equal, the voltage developed across condenser 51 is the average value of the voltage on the plate of switch tube 41. Thus, if the pulses fed to the respective grids of tubes 41 and 42 are 180 degrees out of phase then waveform $a$ of Fig. 6 shows the voltage developed across resistance 50. A square wave results which is symmetrical about ground potential. The voltage to which the condenser 48 charges, due to the heavy conduction of diode 45 is the amplitude $p$ of the positive going portion of the square wave of voltage shown in waveform $a$. Accordingly, the voltage to which condenser 49 charges is the amplitude of the negative going portion $n$ of the said square wave. The average value of the voltage on condensers 48 and 49 are respectively proportional to the positive and negative amplitude $p$ and $n$ of the square wave of voltage across resistance 50. The voltage developed at the output of terminals 52 and 53 is therefore zero for a symmetrical voltage wave.

From what has been said, if the pulses fed to the phase detecting circuit differ in phase from 180 degrees so as to produce a square wave of voltage across resistance 50 as shown by waveform $b$ of Fig. 6, then the average voltage at the output of terminals 52 and 53 will be a net positive value.

If waveform $c$ of Fig. 6 is the voltage across resistance 50, then the average voltage at the output of the phase detector circuit will be a negative value.

It should be noted that a drift of frequency of oscillator 15 would effect the accuracy of the system. This inaccuracy is eliminated by addition of a frequency divider 16 of a suitable type such as are well known in the art to provide the 400 cycle sinusoidal reference voltage used to feed phase shifting devices 5 and 6. Thus any shift in oscillator frequency would cause a corresponding shift in the pulse repetition rate of the pulse fed to phase detector 20.

It should be understood that many modifications may be made of the specific embodiments disclosed without deviating from the scope of the present invention.

The invention described herein may be manufactured and used by or for the Government of the United States of America for governmental purposes without the payment of any royalties thereon or therefor.

What is claimed is:
1. Apparatus for automatically positioning a rotatable directive communications antenna in a direction in which a continuously rotated directive search antenna has received signals of a given frequency comprising the combination of a first means for producing a voltage having a phase which varies in proportion to the position of said search antenna, second means coupled to said search antenna for selectively receiving signals of said given frequency, third means responsive to the burst of energy in the output of said second means to provide a voltage which is substantially in phase with the voltage output of said first means at the time said signal of said given frequency is received, fourth means for producing a voltage having a phase proportional to the position of said communications antenna, means including a phase detecting circuit coupled to the output of said third and fourth means for comparing the phase of the voltage produced thereby and for moving said communications antenna in a direction such as to maintain a given predetermined phase relation between said compared voltages.

2. Apparatus for automatically positioning a rotatable directive communications antenna in a direction in which a continuously rotated directive search antenna has received signals of a given frequency comprising the combination of a first means for producing voltage pulses having a phase which varies in proportion to the position of said search antenna, second means coupled to said search antenna for selectively receiving signals of said given frequency, switch means coupled to the output of said frequency selective receiving means responsive to the burst of energy in the output thereof by being triggered only into a first switch position, third means coupling the output of said first means to said switch means for triggering same only into a second switch position, fourth means for producing pulses of a given pulse repetition rate $f_1$ having a phase proportional to the position of said communications antenna, a source of pulses having a pulse repetition rate $f_2$ which is a multiple of $f_1$, pulse counting means coupled to said source of pulses operative to produce an output pulse every $$\frac{f_2}{f_1}$$

pulse counts, fifth means coupled between said switch means and said pulse counting means for developing a voltage pulse substantially in synchronism with the triggering of said switch means to said second switch position for resetting said pulse count means to zero count position in substantial synchronism therewith, and means including a phase detecting means coupled to the output of said fourth means and said pulse count means for comparing the phases of the voltage pulses produced therein and for moving said communications antenna in a direction such as to maintain a given predetermined phase relation between said compared voltage pulses.

3. Apparatus for automatically positioning a rotatable directive communications antenna in a direction in which a continuously rotated directive search antenna has received signals of a given frequency comprising the combination of a first means for producing voltage pulses having a phase which varies in proportion to the position of said search antenna, second means coupled to said search antenna for selectively receiving signals of said given frequency, third means coupled to the output of said first means and to said second means responsive to the burst of energy in the output of said second means by providing a pulse which is substantially in synchronism with the pulse in the output of said first means which first occurs after said burst of energy is received, fourth means for producing pulses of a given pulse repetition rate $f_1$ having a phase proportional to the position of said communications antenna, a source of pulses having a pulse repetition rate $f_2$ which is a multiple of $f_1$, pulse counting means coupled to said source of pulses operative to produce an output pulse every $$\frac{f_2}{f_1}$$

pulse counts, means coupling the output of said third means to said counting means for rendering same operative to count from zero count position in substantial synchronism therewith, and means including a phase detecting means coupled to the output of said pulse count means and said fourth means for comparing the phase of the voltage pulses produced thereby and for moving said communications antenna in a direction such as to maintain a given predetermined phase relation between said compared voltage pulses.

4. A system for positioning a rotatable shaft to a position represented by the time occurrence of an energy pulse comprising a first means for providing said energy pulse, second means for providing a voltage which is continually changing in phase at a predetermined rate, third means responsive to said energy pulse to provide a voltage which is in phase with the voltage output of said second means at the time said energy pulse occurs, fourth means for providing a voltage having a phase proportional to the position of said rotatable shaft, means including a phase detecting means coupled to the output of said third and fourth means for comparing the phase of the voltages produced thereby and for moving said rotatable shaft in a direction to maintain a given predetermined phase relation between said compared voltages.

5. A system for positioning a given device to a position representing information given in the form of the time occurrence of a given energy pulse comprising a first means for providing said given energy pulse, second means for providing voltage pulses which are continually changing in phase, third means coupled to the output of said first and second means for delivering a voltage pulse which is substantially in synchronism with the pulse in the output of said second means which first occurs after the occurrence of said given energy pulse, fourth means coupled to said given device for providing voltage pulses of a given pulse repetition rate $f_1$ having a phase proportional to the position of said given device, a source of pulses having a pulse repetition rate $f_2$ which is a multiple of $f_1$, pulse counting means coupled to said source of pulses operative to produce an output every $$\frac{f_2}{f_1}$$

pulse counts, fifth means coupling the output of said third means to said counting means for rendering same operative to count from zero count position in substantial synchronism therewith, means including a phase detecting means coupled to the output of said pulse count means and said fourth means for comparing the phase of the pulses produced thereby and for moving said given device in a direction to maintain a given predetermined phase relation between said compared pulses.

6. A system for positioning a given device to a position representing information given in the form of the time occurrence of a given energy pulse comprising a first means for providing said given energy pulse, second means for providing voltage pulses which are continually changing in phase, switch means coupled to the output of said first means responsive to the pulses in the output thereof by being triggered only into a first switch position, third means coupling the output of said second means to said switch means for triggering same only into a second switch position, fourth means coupled to said given device for producing pulses of a given pulse repetition rate $f_1$ having a phase proportional to the position of said device, a source of pulses having a pulse repetition rate $f_2$ which is a multiple of $f_1$, pulse counting means coupled to said source of pulses operative to produce an output pulse every $$\frac{f_2}{f_1}$$

pulse counts, fifth means coupled between said switch means and said pulse counting means for developing a voltage pulse in substantial synchronism with the triggering of said switch means into the second switch position for rendering said pulse counting means operative to count from zero count position in substantial synchronism therewith, means including a phase detecting means coupled to the output of said fourth means and said count pulse means for comparing the phase of the pulses produced thereby and for moving said given device in a direction to maintain a given predetermined phase relation between said compared pulses.

7. A circuit for indicating the time occurrence of a given energy pulse within a given recurrent time interval of $t_1$ seconds by the phase of a recurrent group of pulses comprising a first means for producing a group of pulses whose phase relative to a given frequency $f_1$ is periodically varied over a given range each $t_1$ seconds, a switch means having only two switch positions, a second means coupling said given energy pulse to said switch means for triggering same only into a first given switch position, third means coupling said group of pulses of said first means to said switch means for triggering same only into a second switch position, a source of pulses having a pulse repetition rate $f_2$ which is a multiple of $f_1$, a pulse counting means coupled to said source of pulses operative to produce an output pulse every $$\frac{f_2}{f_1}$$

pulse counts, fourth means coupled between said switch means and said counting means for developing a voltage pulse in synchronism with the triggering of said switch means to said second switch position for resetting said pulse counting means into zero pulse count position in synchronism therewith, whereby the phase of the pulses produced at the output of said pulse count means indicates the time occurrence of said given energy pulse.

8. The combination of a first means for providing a pulse of energy which varies in phase relative to a given frequency $f_1$ to represent a given quantity of information, a source of pulses having a pulse repetition rate $f_2$ which is a multiple of $f_1$, frequency divider means coupled to said source of pulses for producing a pulse every $$\frac{f_2}{f_1}$$

pulses, means coupling the pulse output of said first means to said frequency divider means for resetting same to zero pulse count position in synchronism therewith.

9. The combination of a first means for providing a pulse of energy which varies in phase relative to a given frequency $f_1$ to represent a given quantity of information, a source of pulses having a pulse repetition rate $f_2$ which is a multiple of $f_1$, pulse counting means coupled to said source of pulses operative to produce an output pulse every $$\frac{f_2}{f_1}$$

pulse counts, means coupled between the output of said first means and said pulse counting means for resetting said pulse counting means to zero count position in synchronism with said pulse of energy.

10. The combination of a first means for providing a pulse of energy which varies in phase relative to a given frequency $f_1$ to represent a given quantity of information, a source of pulses having a pulse repetition rate $f_2$ which is a multiple of $f_1$, pulse counting means coupled to said source of pulses operative to produce an output pulse every $$\frac{f_2}{f_1}$$

counts, means coupling the pulses at the output of said first means to said counting means for rendering said counter operative to count from zero count position in synchronism with said pulses of energy.

References Cited in the file of this patent

UNITED STATES PATENTS

| | | |
|---|---|---|
| 2,234,244 | Gossel | Mar. 11, 1941 |
| 2,257,319 | Williams | Sept. 30, 1941 |
| 2,448,007 | Ayres | Aug. 31, 1948 |
| 2,487,822 | McLamore et al. | Nov. 15, 1949 |
| 2,523,244 | Woodward | Sept. 19, 1950 |
| 2,550,700 | Lancor et al. | May 1, 1951 |